US012586094B2

(12) United States Patent　　　(10) Patent No.:　US 12,586,094 B2
Kotta et al.　　　　　　　　　　(45) Date of Patent:　Mar. 24, 2026

(54) AUTOMATIC EXPERIENCE RESEARCH WITH A USER PERSONALIZATION OPTION METHOD AND APPARATUS

(71) Applicant: YAHOO ASSETS LLC, Dulles, VA (US)

(72) Inventors: Guruganesh Kotta, Fremont, CA (US); Michael Natkovich, San Francisco, CA (US); Mahendrasinh Jadav, San Jose, CA (US); Miao Chen, Sunnyvale, CA (US); Chandrashekhar Shaw, San Jose, CA (US); Rahul Kapoor, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 206 days.

(21) Appl. No.: 17/542,642

(22) Filed: Dec. 6, 2021

(65) Prior Publication Data

US 2023/0177539 A1　　Jun. 8, 2023

(51) Int. Cl.
*G06Q 30/0203*　　(2023.01)
*G06N 20/00*　　　(2019.01)
*G06Q 30/0282*　　(2023.01)

(52) U.S. Cl.
CPC ......... *G06Q 30/0203* (2013.01); *G06N 20/00* (2019.01); *G06Q 30/0282* (2013.01)

(58) Field of Classification Search
CPC . G06Q 30/0203; G06Q 30/0282; G06N 20/00
See application file for complete search history.

(56) References Cited

U.S. PATENT DOCUMENTS 6,831,663 B2 * 12/2004 Chickering ............ G06Q 10/02
　　　　　　　　　　　　　　　　　707/999.102
2010/0185579 A1 * 7/2010 Hong .................... G06Q 30/02
　　　　　　　　　　　　　　　　　706/54

(Continued)

OTHER PUBLICATIONS

Personalized mobile marketing strategies. Tong Siliang; Luo Xueming; Xu, Bo. Journal of the Academy of Marketing Science 48.1: 64-78. New York: Springer Nature B.V. (Jan. 2020).*

(Continued)

*Primary Examiner* — Timothy Padot
(74) *Attorney, Agent, or Firm* — James J. DeCarlo; Greenberg Traurig, LLP

(57) ABSTRACT

Techniques for evaluating a user experience experiment designed to use one user experience variant selected from a number of user experience variants as a global-best user experience variant to be used across users relative to a machine model trained to use user data to identify a user-preferred user experience variant. Disclosed systems and methods provide techniques for optimizing user response. In one embodiment, a global-best user experience variant is evaluated by comparing an aggregate user response determined for the global-best user experience variant to an aggregate user response determined using user response predictions determined using the trained machine model, and using the outcome of the comparison to make a recommendation as to which one of the global-best user experience variant and the trained machine model to adopt for providing a user experience to users.

20 Claims, 9 Drawing Sheets

(56)          References Cited

U.S. PATENT DOCUMENTS

| | | | |
|---|---|---|---|
| 2011/0258049 A1* | 10/2011 | Ramer | G06Q 30/0273 |
| | | | 705/14.69 |
| 2012/0191531 A1* | 7/2012 | You | G06F 16/958 |
| | | | 705/14.42 |
| 2015/0248615 A1* | 9/2015 | Parra | G06N 5/04 |
| | | | 706/46 |
| 2016/0055236 A1* | 2/2016 | Frank | G06F 40/35 |
| | | | 707/748 |
| 2019/0205939 A1* | 7/2019 | Lal | G06N 3/09 |

OTHER PUBLICATIONS

Predicting Implicit User Preferences with Multimodal Feature Fusion for Similar User Recommendation in Social Media Applied Sciences11. 3: 1064. MDPI AG. (2021).*

Applications of recommender systems in target selection. Krishnamoorthy, Srikumar; Bhasker, Bharat. Journal of Targeting, Measurement and Analysis for Marketing13.1: 61-69. Palgrave Macmillan. (Oct. 2004).*

R. Tahir, "Analyzing the intelligence in user interfaces," 2015 SAI Intelligent Systems Conference (IntelliSys), London, UK, 2015, pp. 674-680.*

* cited by examiner

100

400

RECEIVE EVALUATION REQUEST

402

SELECT A POOL OF USERS INVOLVED IN THE EXPERIENCE RESEARCH EXPERIMENT

404

OBTAIN USER DATA AND DETERMINE USER DATA FOR USERS IN THE USER POOL

406

TRAIN MODEL USING USER DATA OF USERS IN TRAINING USER GROUP

408

TEST TRAINED MODEL

410

PERFORM EVALUATION

412

RECOMMEND APPROACH BASED ON THE EVALUATION

414

600

| USER | VARIANT | ATTRIBUTE X CAR MAKE (TESLA, KIA, TOYOTA) | ATTRIBUTE Y HOME OWNERSHIP (Y/N) | METRIC (ARTICLES READ) |
|---|---|---|---|---|
| USER100 | A | TESLA | Y | 18 |
| USER101 | A | TESLA | Y | 10 |
| USER102 | A | KIA | N | 5 |
| USER200 | B | TOYOTA | N | 7 |
| USER201 | B | KIA | N | 3 |
| USER202 | B | TOYOTA | Y | 15 |
| USER300 | C | TESLA | N | 15 |
| USER301 | C | TOYOTA | N | 5 |
| USER302 | C | KIA | Y | 10 |

602
604
606

620

| VARIANT | METRIC AVERAGE | BEST |
|---|---|---|
| A | (18+10+5)/3=11 | X |
| B | (7+3+15)/3=8.33 (OR 8) | |
| C | (15+5+10)/3=10 | |

622

700

| USER | VARIANT | ATTRIBUTE X CAR MAKE (TESLA, KIA, TOYOTA) | ATTRIBUTE Y HOME OWNERSHIP (Y/N) | METRIC (ARTICLES READ) | METRIC TYPE |
|------|---------|-------------------------------------------|----------------------------------|------------------------|-------------|
| USER102 | A | KIA | N | 5 | ACTUAL |
| USER102 | B | KIA | N | 8 | AVERAGE |
| USER102 | C | KIA | N | 10 | AVERAGE |
| USER202 | A | TOYOTA | Y | 11 | AVERAGE |
| USER202 | B | TOYOTA | Y | 15 | ACTUAL |
| USER202 | C | TOYOTA | Y | 10 | AVERAGE |
| USER302 | A | KIA | Y | 11 | AVERAGE |
| USER302 | B | KIA | Y | 8 | AVERAGE |
| USER302 | C | KIA | Y | 10 | ACTUAL |

| USER | VARIANT | MODEL METRIC PREDICTION | METRIC TYPE | ACTUAL/ AVERAGE METRIC | CHOSEN |
|---|---|---|---|---|---|
| USER102 | A | 4 | ACTUAL | 5 | |
| USER102 | B | 7 | AVERAGE | 8 | |
| USER102 | C | 12 | AVERAGE | 10 | X |
| USER202 | A | 12 | AVERAGE | 11 | |
| USER202 | B | 13 | ACTUAL | 15 | X |
| USER202 | C | 7 | AVERAGE | 10 | |
| USER302 | A | 15 | AVERAGE | 11 | X |
| USER302 | B | 13 | AVERAGE | 8 | |
| USER302 | C | 3 | ACTUAL | 10 | |

802

804

806

810

| VARIANT | METRIC AVERAGE | BEST |
|---|---|---|
| A | (18+10+5)/3=11 | |
| B | (7+3+15)/3=8.33 (OR 8) | |
| C | (15+5+10)/3=10 | |
| ML | (10+15+11)/3=12 | X |

AUTOMATIC EXPERIENCE RESEARCH WITH A USER PERSONALIZATION OPTION METHOD AND APPARATUS

FIELD OF THE DISCLOSURE

The present disclosure relates to improvements to user experience research systems and specifically to providing a user personalization option in connection with user experience research systems.

BACKGROUND

One methodology currently used in user experience research computing systems is a randomized experiment in which users are assigned to different groups, or buckets. For example, experience research (and user experience experimentation) refers to a testing approach in which users are assigned to one of a number of different user groups (also referred herein as buckets), e.g., an "A" bucket or a "B" bucket. Typically, users assigned to one user group are exposed to a different user experience than users assigned to another user group. One or more metrics (e.g., page views, clicks, return visits, etc.) can be used to measure users' "reaction" to each experience. To further illustrate, one experience in an experiment can be a control version (e.g., a current web page) and another experience can be a variant of the control version, or variant version. Typically, the variant version varies one aspect, or variable, of the control version so that metrics associated with the control version can be compared with metrics associated with the variant version.

Experience research can be useful in understanding user engagement and satisfaction with features of a user interface (e.g., a web page, mobile application display or some portion thereof). Using this example, users assigned to the A bucket, which can be referred to as a control bucket, or group, can be exposed to a control version (e.g., an existing version) of the user interface and users assigned to the B bucket, which can be referred to as a variant bucket or group, can be exposed to a variant user interface—a variant of the user interface presented to the control group. Typically, the variant user interface includes a single variant from the control user interface, but it may include multiple differences from the control group's user interface. The reaction of the control and variant user groups can be obtained (e.g., explicit feedback, implicit feedback or some combination) and used in determining whether the differences included in the variant are detrimental.

Typically, user feedback is used to select one of the experiences being evaluated in the experiment (e.g., the control or one of the variants presented to the users enlisted in the experiment), and then globally adopt the selected experience for use with all of the users.

While user experience research can be used to identify one user experience that is satisfying to the users in order to maximize user engagement, adopting one user experience for all users, i.e., a user experience as a "global winner," can be ineffective at maximizing user engagement.

Accordingly, it is important to be able to ascertain whether or not a "global winner" approach effectively maximizes user engagement.

SUMMARY

The present disclosure provides novel systems and methods for automatic experience research with a user personalization option. Experience research involves providing a different variant to each of a number of groups, or buckets, of users, measuring the user response to each variant and identifying one of the variants (a "global winner", or global-best variant) to adopt for all users based on the user response. Embodiments of the present disclosure provide a user personalization option with an ability to predict which variant to serve to each user, and provide a variant best suited for each user based on the prediction rather than adopting one variant as the global winner. Embodiments of the present disclosure can determine whether to use the outcome of the experience research (e.g., a global-best variant determined in the experience research) or to adopt a user personalization approach to personalize the experience for each user.

By way of a non-limiting example, an experience research system can provide a number of user experience experiments, where each user experience experiment can be designed to identify one user experience variant out of a number of user experience variants as a global-best user experience variant to be used across users. The user experience experiment measures user response to each user experience variant and identifies the variant with the best user response as the global-best variant, which is then adopted for use all users regardless of a user's particular user experience preference.

Disclosed systems and methods can be used to evaluate the outcome of such an experiment relative to a machine model trained to use user data to identify a user-preferred user experience variant. Disclosed systems and methods provide techniques for optimizing user response. In one embodiment, a global-best user experience variant is evaluated by comparing an aggregate user response determined for the global-best user experience variant to an aggregate user response determined using user response predictions determined using the trained machine model, and using the outcome of the comparison to make a recommendation as to which one of the global-best user experience variant and the trained machine model to adopt for providing a user experience to users.

Presently, conventional user experience research (e.g., A/B testing, bucket testing, split-run testing, etc.) involves exposing different groups (or buckets) of users to different user experience variants, determining each group's response to the variant provided to the group, and then using each group's response in selecting one of the variants (e.g., the "global winner") that is considered to be the variant most effective at maximizing user engagement, which can be indicated by user response.

For example, assume that a website design team is considering redesigning the website's logo. The design team creates three color variants of the logo, each of the variants using a different color for the logo—one variant using green, one variant using red and a third using blue. Using the conventional user experience research approach, users from a user pool are assigned to three buckets, each bucket of users being exposed to one of the three variants—one subset of the users assigned to a first bucket being provided with the green logo, another subset of the users being providing the red logo and another subset of the users being providing the blue logo. Each user's interaction with the variant presented to the user can be measured (e.g., using one or more metrics), user response is then aggregated for each variant, and one of the variants is selected based on a comparison of each variant's aggregate user response. Assuming for the sake of example, the red logo's user response indicated that its users reacted more favorably to it than the users presented with either the green or the blue logo. In that case, using the "global winner" approach, the website design team selects the red logo (as the global winner) for the website design and discontinues the use of the green and blue logos.

As illustrated by the above example, the conventional experience research approach is a one-size-fits-all approach. This approach can negatively impact user engagement as it does not take into account a particular user's preference (e.g., each user's logo preference). It is very likely that some users actually prefer one of the discontinued logos—i.e., some users prefer the green logo and some prefer the blue logo.

Embodiments of the present disclosure provide a framework to evaluate the effectiveness of the "global winner" approach used by conventional experience research platforms at optimizing user engagement (or user response) and offer a personalized user experience approach in a case that the "global winner" approach is determined to be less effective at optimizing user engagement. In accordance with one or more embodiments, the personalization can be provided at a user segment level, which allows the user experience to be personalized for a segment of users. A user segment can comprise one or more users having a set of data (or features) in common.

In accordance with embodiments of the present disclosure, machine learning can be used to train user response prediction model to predict user response in connection with a number of experience variants using data associated with a user. Embodiments of the present disclosure train a statistical machine model to predict a user's response to each variant (e.g., different color logos), and then select a variant with the best predicted response. Using the trained model, a preferred user experience can be served to each user, or user segment.

By way of one non-limiting example, in the case of a user segment, one segment of users with an interest in finance may prefer the green logo, while another segment of users interested in sports prefer the red logo. By way of another non-limiting example, users located in a first geographical area may prefer the red logo, while users located in a second geographical area may prefer the blue logo. The disclosed systems and methods can learn which user segments prefer which variant of an experience, which results in an improved user experience and increased user engagement in comparison to conventional experience research.

According to some embodiments, the disclosed systems and methods first select a pool of users from users involved in a conventional user experience experiment (e.g., an A/B test or the like). In accordance with one or more embodiments, the pool of users can comprise the set of users used in the experiment, or a subset of the users. The pool of users can be selected by obtaining user response metric values for each user involved in the experiment. By way of some non-limiting example, user response metrics with values that can be obtained include days visited by the user, number of user sessions, number of clicks, number of classic page views, number of additive page views, articles read, and the like. In discussing embodiments of the present disclosure, one or more of the metric values can be used to measure user response. By way of one non-limiting example, days visited can be one metric and corresponding value used to indicate user response. It should be apparent that any other metric and/or additional metrics can be used with embodiments of the present disclosure to measure user response. In accordance with one or more embodiments, a composite of multiple metrics can be used.

By way of a non-limiting example, to avoid any seasonality, a week of data can be obtained in connection with each of the users involved in the user experience experiment, and the users in the user pool can be selected such that each day of the week has associated users who engaged in the test (e.g., have a value for the user response metric) that day.

The disclosed systems and methods can then obtain metric value data indicating user response (e.g., days visited metric value) for each user in the user pool over a second period (e.g., two weeks) during the user experience experiment. The metric value data obtained for a user in the pool of users indicates the user's response to one of the variants in the experiment—the variant corresponding to the group (or bucket) to which the user is assigned in the user experience experiment. A user response to a respective variant can be determined for each user in the pool of users.

The disclosed systems and methods can then determine user data (e.g., a set of features) for each user in the user pool. In accordance with at least one embodiment, a designation identifying the variant (and user group) to which the user is assigned in the user experience experiment can be included in the user data. The user data can include user attributes data. Some non-limiting examples of types of attribute data include user demographic data, user device data, user behavior data and the like. The use data obtained for the users in the user pool can then be used to generate statistical model training and test data for use in training and testing (respectively) the model, and evaluating whether or not to use of a global-best user experience variant for all users. In accordance with one or more embodiments, a simulation can be used to determine effectiveness of using a "global winner" approach as compared to using a trained model and a user personalization approach.

In accordance with one or more embodiments, the pool of users can be split into at least two user groups—a training user group, testing user group, evaluation user group and the like. Each user can be assigned to one of the user groups. By way of one non-limiting example, in the case of two groups, the split might be an 80-20 split, with 80% of the users in the pool being assigned to a training user group and 20% to evaluation user group. In accordance with one or more embodiments, with respect to each user group in the user experience experiment, 80% of the users assigned to each of the user groups used in the experiment can be assigned to a training user group and 20% of the users assigned to each user group used in the experiment can be assigned to the evaluation user group. By way of a further non-limiting example, the pool of users can be split into three groups—a training user group (e.g., 80% of the user pool), test user group (e.g., 10% of the user pool) and an evaluation user (e.g., 10% of the user pool).

The disclosed systems and methods can then use the user data associated with the users in the training user group to generate training data (e.g., feature vectors). For each user in the training user group, the training data can comprise the user's determined set of features (e.g., assigned group in the user experience experiment and the user's demographic, device, behavioral, etc. features). The user response (e.g., days visited metric value) determined for the user from the experiment can be used as a label for supervised model training.

For each user in the evaluation user group, as is discussed in more detail below, in a testing phase, the trained model can be used to generate a predicted user response to the variant corresponding to the user group to which the user is assigned in the user experience experiment. The predicted user response can be compared with the actual metric value determined for the user from the experiment to determine the trained model's level of accuracy.

The disclosed systems and methods can then train and test the model (e.g., a regression model). The set of training data determined for the users assigned to the training user group can be used to train the model, such that the trained model can generate a predicted user response to a given variant for a given user using the user's data.

In accordance with one or more embodiments, in the testing phase, the accuracy of the trained model can be determined using test data corresponding to the users assigned to the evaluation user group or users assigned to another group, such as a model testing user group. For purposes of testing, for a given user in the evaluation user group, the input to the model comprises the user's data (e.g., set of features), which can include the user group to which the use is assigned in the user experience experiment. The trained model uses the input to generate a predicted user response (e.g., a predicted metric value, such as and without limitation a predicted number of days visited) given the model input. A user response prediction to a given variant from the user experience experiment can be generated for each user in the evaluation user group. For example, for a user in the evaluation user group, a user response prediction can be generated for the variant associated with the user group to which the user is assigned in the user experience experiment, and the user response prediction can be compared to the actual user response to the variant obtained from the user experience experiment to determine any difference. This can be done for each user in the evaluation user group.

In accordance with one or more embodiments, an aggregate error (e.g., Mean Squared Error, Mean Absolute Error) can be determined using the differences determined for each of the users in the evaluation user group. The aggregate error can be used to determine whether or not the level of accuracy of the model is acceptable. If the level of accuracy of the model is unacceptable, the model can be retrained.

The disclosed systems and methods can then use the trained model in a number of simulations to evaluate the effectiveness of the experience research (or global-best variant) approach designed to use a global-best user experience variant relative to a personalized user experience approach that uses the trained model to provide personalized user experience based on data about a user.

Assuming an acceptable level of accuracy of the trained model during model testing, the disclosed systems and methods can evaluate whether or not the trained model can provide an improved outcome over a "global winner" approach used with conventional experience research. As discussed above, the outcome of a user experience experiment is the identification of a variant (the "global winner") that is adopted for use across users. In contrast, the machine learning approach described herein in connection with one or more embodiments uses the trained model to identify which variant a specific user (or user segment) is likely to prefer given an associated set of user data (e.g., set of features).

A user response prediction can be obtained for each user and each user experience variant from the user experience experiment using the trained model and each user's associated set of data. To determine a user response for a given variant and user, a designation indicating the variant can be included with a number of user attribute values as input to the trained model. In accordance with embodiments of the present disclosure, the output of the trained model is a predicted user response to the variant indicated in the input and for the user which features are input to the trained model. For a given user, a user response prediction can be obtained for each variant used the user experience experiment.

In accordance with one or more embodiments, evaluating the effectiveness the experience research (or global-best variant) approach designed to use a global-best user experience variant relative to a personalized user experience approach that uses the trained model to provide personalized user experience based on data about a user can comprise comparing respective user responses to determine which approach optimized user response.

In accordance with one or more embodiments, an aggregate user response can be determined for each variant used in the user experience experiment. For a given variant, all of the user response metric data with a corresponding variant designation indicating the variant can be used to generate the variant's aggregate user response (e.g., an average of the user response data). The aggregate user responses determined for variants can be used to identify one of the variants with an aggregate user response that is greater than the aggregate user response of each of the other variants. The identified variant can be used as the global-best user experience variant for purposes of evaluation.

In accordance with one or more embodiments, an aggregate user response (e.g., an average metric) prediction can be determined using the trained model. The trained model can be used to predict a user response for a given user and variant using the user's data (e.g., attribute data and variant designation). The trained model can be used to predict a user's response to each of the variants. The user response predictions determined for the variants can then be used to identify one of the variants as the predicted best variant for the user. This process can be used to identify a predicted best variant for each user in the evaluation user group. A user response can be determined for each user's predicted best variant. In a case that the user's predicted best variant corresponds to the variant to which the user is assigned in the user experience experiment, the user response metric obtained for the user form the experiment can be used as the user's response. Otherwise, the aggregate user response determined for the predicted best variant can be used as the user's response. A user response can be determined in this manner for each user in the evaluation user group, and then used to determine the aggregate user response prediction.

In accordance with one or more embodiments, an effectiveness (or ability) of the experience research (or global-best variant) approach to optimize user response can be evaluated relative to the personalized user experience approach that uses the trained model to provide personalized user experience by comparing the aggregate user response and the aggregate user response prediction to identify which user response is the best (e.g., highest, greatest, etc.).

In accordance with one or more embodiments, the outcome of the evaluation can be used to make a recommendation to use one or the other approach. By way of a non-limiting example, the personalized user experience approach that uses the trained model to provide personalized user experience based on data about a user can be recommended over the experience research (or global-best variant) approach designed to use a global-best user experience variant in a case that the aggregate user response prediction is greater than the global-best user experience variant's corresponding aggregate user response. Otherwise, the recommendation can be to use the experience research approach.

It will be recognized from the disclosure herein that embodiments of the instant disclosure provide improvements to a number of technology areas, for example those related to systems and processes that provide user interface displays, including online and application user interface displays. By way of some non-limiting examples, systems and processor can use user interface displays to display content, distribute content, provide recommendations, provide search engine results, etc. The disclosed systems and methods can effectuate increased speed and efficiency in the ways that user engagement is maximized with experience research, as the disclosed systems and methods, inter alia, automatically select a pool of users from a user experience experiment, generate training data for users (from the pool of users) assigned to a training user group, train a user response prediction model using the training data, and use the trained model to make user variant predictions that can be used to evaluate the effectiveness of an experience research (or global-best variant) approach to optimize user engagement.

In accordance with one or more embodiments, a method is disclosed which includes receiving, at a computing device, an evaluation request in connection with a user experience experiment designed to adopt a global-best user experience variant, from a number of user experience variants, for use across users, the user experience experiment involving a number of user groups corresponding to the number of user experience variants; forming, via the computing device, a training user group and an evaluation user group using a pool of users from the number of user groups; obtaining, via the computing device and for each user in the user pool, user data comprising, for each user, an experience variant designation and a corresponding user response metric from the user experience experiment and a number of user attributes; using, via the computing device, the experience variant designation and the corresponding user response metric obtained for each user in the evaluation user group to determine a number of aggregate user responses corresponding to the number of user experience variants; using, via the computing device, the number of aggregate user responses to identify one of the number of user experience variants with a corresponding aggregate user response greater than each other of the number of aggregate user response as the global-best user experience variant for evaluation; generating, via the computing device, training data using the user data corresponding to each user assigned to the training user group; training, via the computing device and a machine learning algorithm, a user response prediction model using the training data; using the trained user response prediction model to determine, for each user in the evaluation user group, a variant preference prediction identifying one of the number of user experience variants and a corresponding user response prediction; determining an aggregate user response prediction using the user response prediction determined for each user in the evaluation user group; automatically evaluating, via the computing device, an ability of the global-best user experience variant at optimizing user response relative to the trained user response prediction model's ability using the global-best user experience variant's corresponding aggregate user response and the aggregate user response prediction; and making, via the computing device, a recommendation for providing a user experience to users based on the evaluation.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatic experience research with a user personalization option.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which:

FIGS. 6-8 are diagrams of an exemplary example of a non-limiting embodiment in accordance with some embodiments of the present disclosure.

DETAILED DESCRIPTION

Figure 1:
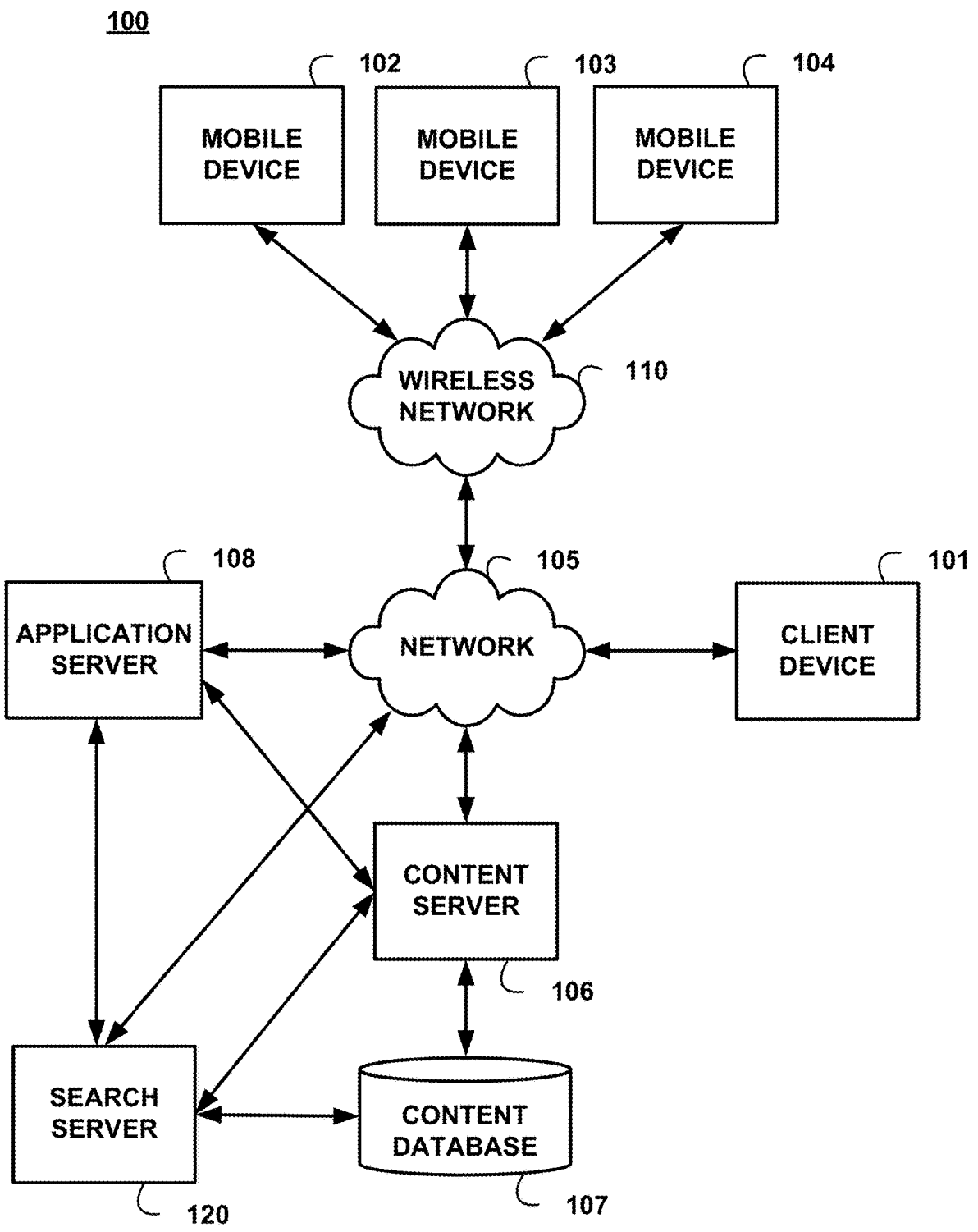
FIG. 1 is a schematic diagram illustrating an example of a network within which the systems and methods disclosed herein could be implemented according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment"

as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, a conventional experience research involves the use of a user experience experiment in which users are assigned to one of a number (e.g., two or more) user groups for purposes of comparing user reaction to different user experiences. One group of users can be exposed to one experience and at least one other user group is exposed to a different experience. Experience research involving user experience experiments can be a very effective tool in designing a user interface. One group of users can be exposed to one version of the user interface while another one or more user groups can each be exposed to a different version of the user interface. Data associated with a number of metrics indicating user response can then be gathered and used to determine whether one of the user interface designs is better than another in terms of user reaction—e.g., improved user engagement and satisfaction relative to the other user interface designs.

The conventional experience research approach is a one-size-fits-all approach. This approach can negatively impact user engagement as it does not take into account a particular user's preference (e.g., each user's logo preference). It is very likely that some users actually prefer a logo other than a global-best logo selected using the experience research—e.g., some users can prefer the green logo and some prefer the blue logo.

Embodiments of the present disclosure provide a framework to evaluate the effectiveness of an experience research (or global-best variant) approach designed to use a global-best user experience variant and offer a personalized user experience approach that uses a trained model to provide personalized user experience based on data about a user in a case that the experience research (or global-best variant) approach is determined to be less effective at optimizing user engagement than the personalized user experience approach. In accordance with one or more embodiments, the personalization can be provided at a user segment level, which allows the user experience to be personalized for a segment of users. A user segment can comprise one or more users having a set of features in common.

In accordance with embodiments of the present disclosure, a machine learning algorithm can be used to train a model to determine user experience preferences of users using user data. Embodiments of the present disclosure train a statistical machine model to predict a user's response to each user experience variant (e.g., different color logos), and then select a variant with the best predicted response. A preferred user experience can be served to each user, or user segment, using the trained model a data associated with a user, or user segment. By way of one non-limiting example, in the case of a user segment, one segment of users with an interest in finance may prefer the green logo, while another segment of users interested in sports prefer the red logo. By way of another non-limiting example, users located in a first geographical area may prefer the red logo, while users located in a second geographical area may prefer the blue logo. The disclosed systems and methods can learn which user segments prefer which variant of an experience, which results in an improved user experience and increased user engagement in comparison to conventional experience research.

It will be recognized from the disclosure herein that embodiments of the instant disclosure provide improvements to a number of technology areas, for example those related to systems and processes that provide user interface displays, including online and application user interface displays. By way of some non-limiting examples, systems and processor can use user interface displays to display content, distribute content, provide recommendations, provide search engine results, etc. The disclosed systems and methods can effectuate increased speed and efficiency in the ways that user engagement is maximized with experience research, as the disclosed systems and methods, inter alia, automatically select a pool of users from a user experience experiment, generate training data for users (from the pool of users) assigned to a training user group, train a user response prediction model using the training data, and use the trained model to make user variant predictions that can be used to evaluate the effectiveness of an experience research (or global-best variant) approach to optimize user engagement.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Devices 101-104 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior (s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server or ad network.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
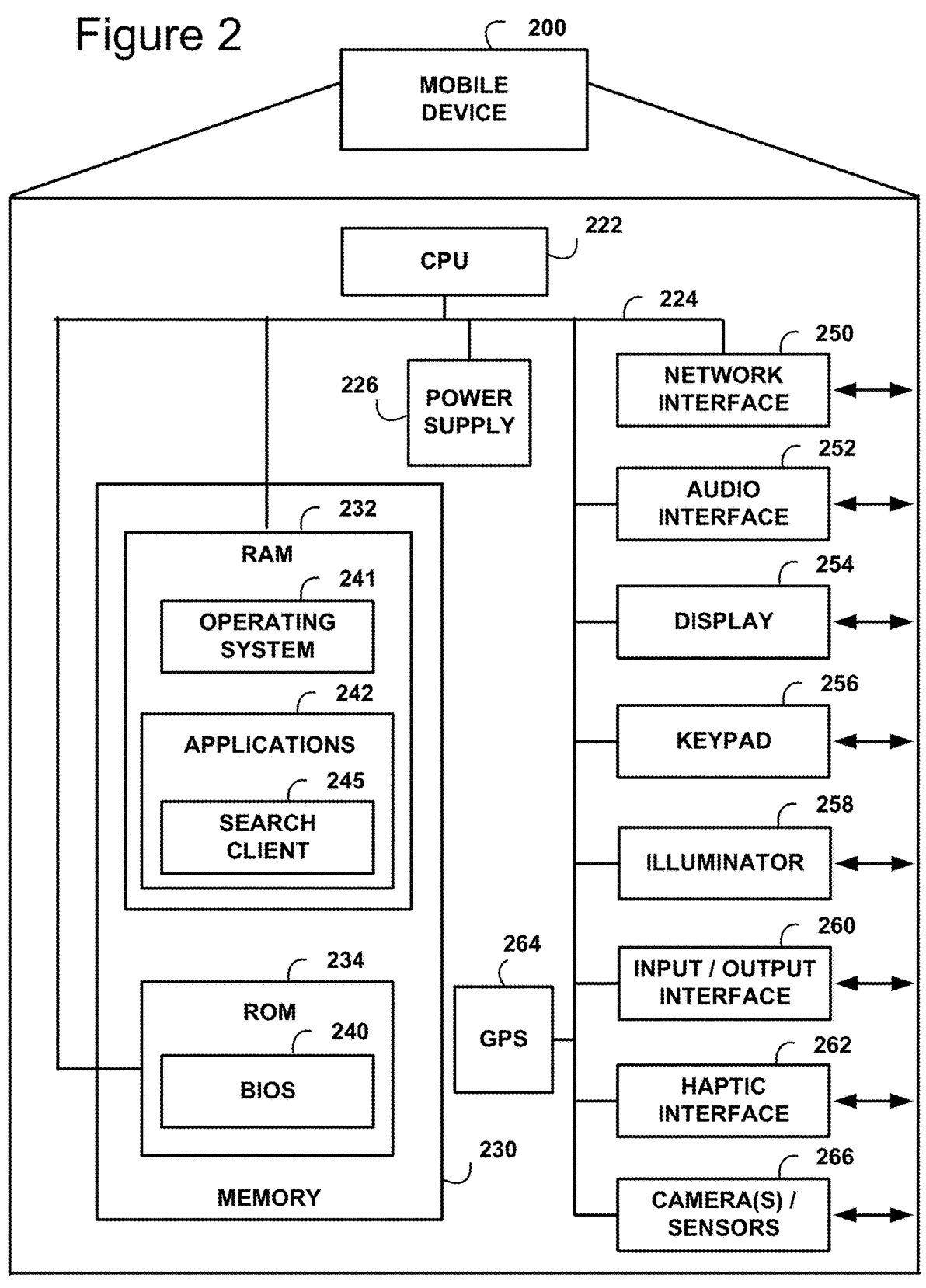
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Device 200 may include many more or less components than those shown in FIG. 2. However, the components shown are sufficient to disclose an illustrative embodiment for implementing the present disclosure. Device 200 may represent, for example, client device 101 and mobile devices 102-104 discussed above in relation to FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, an input/output interface 260, a haptic interface 262, an optional global positioning systems (GPS) transceiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Device 200 may optionally communicate with a base station (not shown), or directly with another computing device. Network interface 250 includes circuitry for coupling device 200 to one or more networks, and is constructed for use with one or more communication protocols and technologies as discussed above.

Optional GPS transceiver 264 can determine the physical coordinates of device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of device 200 on the surface of the Earth. In an embodiment, device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of device 200. The mass memory also stores an operating system 241 for controlling the operation of device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by device 200 to store, among other things, applications 242 and/or other data. For example, data stores may be employed to store information that describes various capabilities of device 200. The information may then be provided to another device based on any of a variety of events, including being sent as part of a header during a communication, sent upon request, or the like. At least a portion of the capability information may also be stored on a disk drive or other storage medium (not shown) within device 200.

Applications 242 may include computer executable instructions which, when executed by device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
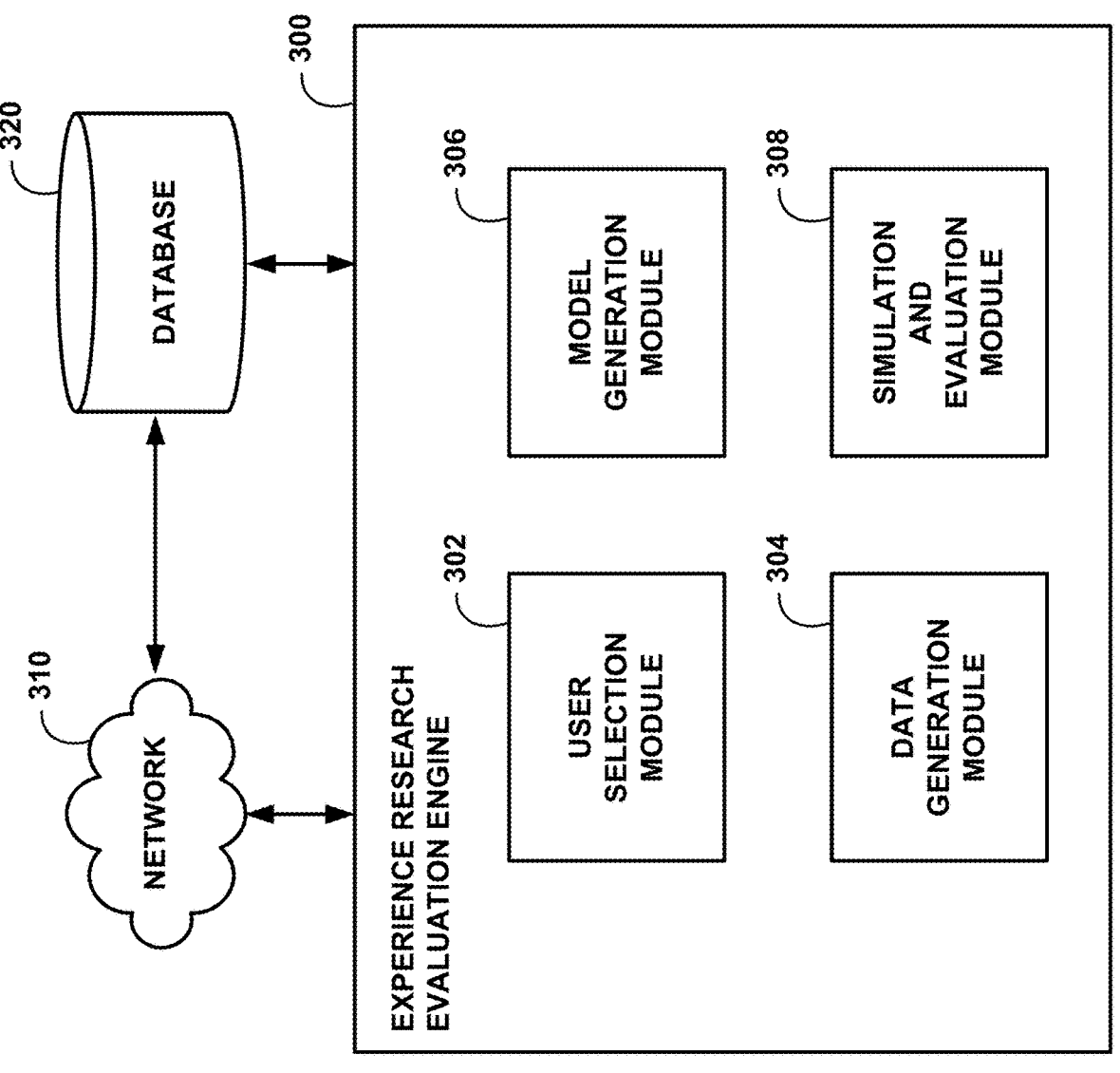
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes an experience research evaluation engine 300, network 310 and database 320. The engine 300 can be a special purpose machine or processor and could be hosted by an application server, content server, social networking server, web server, search server, content provider, email service provider, ad server, user's computing device, and the like, or any combination thereof.

According to some embodiments, the engine 300 can be embodied as a stand-alone application that executes on a computing device, user computing device, server computing device, etc. In some embodiments, the engine 300 can function as an application installed on the computing device, and in some embodiments, such application can be a web-based application accessed by the computing device over a network.

The database 320 can be any type of database or memory, and can be associated with a content server on a network (such as and without limitation a content server, search server, application server, etc.) or a user's device. Database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

In some embodiments, the database 320 can include, for purposes of creating buckets, or groups of users for bucket experiments, user data including metric data indicating user response, bucket assignments, user feature data, model training and test data, simulation data, etc.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include data discussed herein in connection with embodiments of the present disclosure by which the effectiveness of the experience research (or global-best variant) approach designed to use a global-best user experience variant can be evaluated relative to a personalized user experience approach that uses the trained model to provide personalized user experience. It should be understood that the data (and metadata) in the database 320 can be any type of information related to a user, content, a device, an application, a service provider, a content provider, whether known or to be known, without departing from the scope of the present disclosure.

The network 310 can be any type of network such as, but not limited to, a wireless network, a local area network (LAN), wide area network (WAN), the Internet, or a combination thereof. The network 310 facilitates connectivity of the engine 300, and the database of stored resources 320. Indeed, as illustrated in FIG. 3, the engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as engine 300, and includes user selection module 302, data generation module 304, model generation module 306, and simulation and evaluation module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the engine 300 can be supplied to the database 320 in order to ensure that the information housed in the database 320 is up-to-date as the disclosed systems and methods leverage real-time information, as discussed in more detail below.

Figure 4:
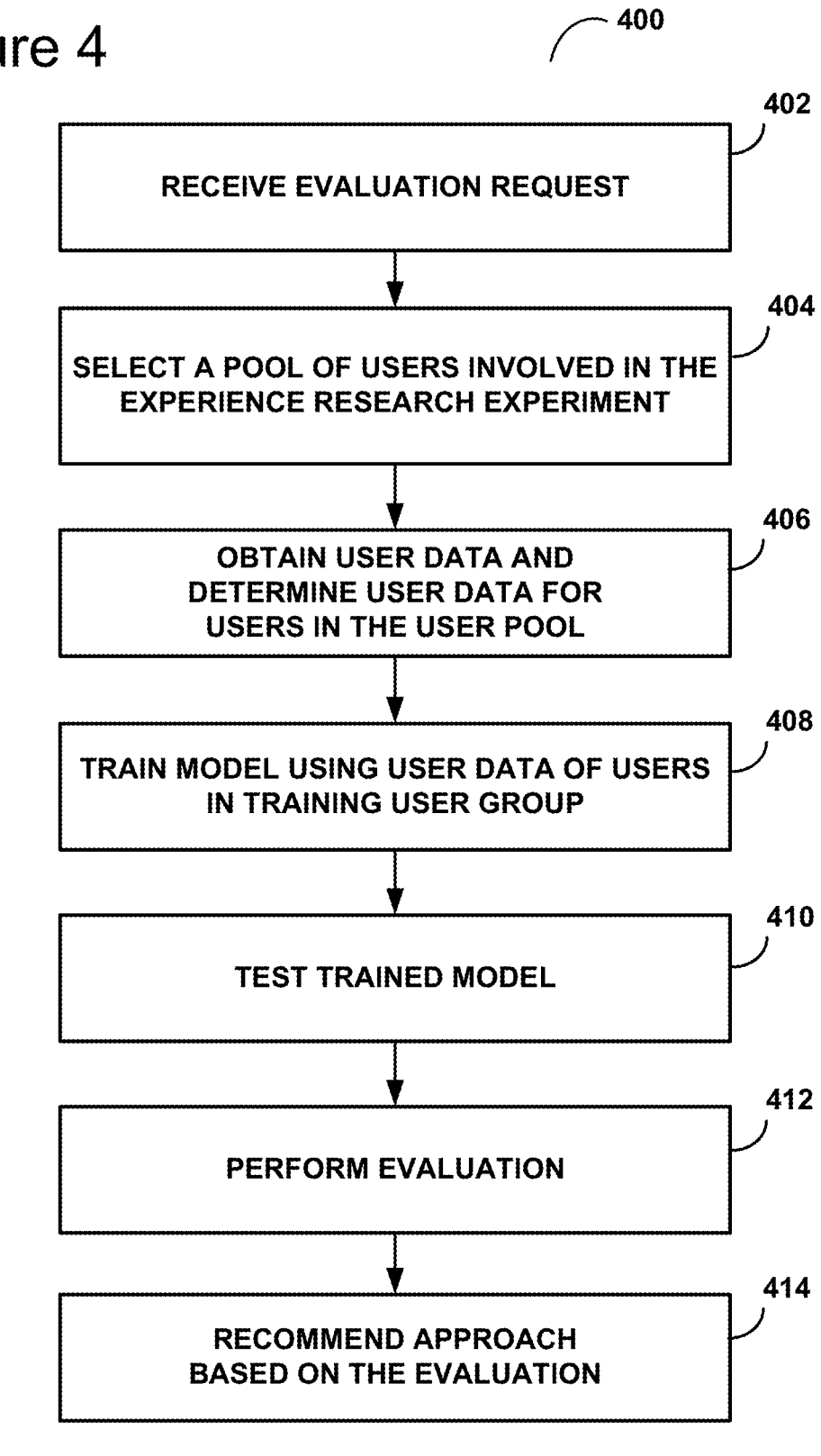
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for the effectiveness of the experience research (or global-best variant) approach designed to use a global-best user experience variant relative to a personalized user experience approach that uses the trained model to provide personalized user experience based on data about a user. According to some embodiments, as discussed herein with relation to FIG. 4 the process involves automatically selecting a pool of users from a user experience experiment, generating training data for users (from the pool of users) assigned to a training group, training a user experience preference prediction model using the training data, and using the trained model to evaluate the effectiveness of an experience research (or global-best variant) approach versus a personalized user experience approach in maximizing user engagement, as discussed in more detail below.

At step 402, which is performed by engine 300, an evaluation request is received in connection with a user experience experiment designed to adopt a global-best user experience variant, from a number of user experience variants, for use across user population, the user experience experiment can involve a number of user groups corresponding to a number of user experience variants. Each user experience variant can include a variation from the other user experience variant(s). For example, experience research designed to identify a global-best color for a website logo can involve a user experience experiment with a number of user experience variants, each of which can use a different color for the logo.

At step 404, which is performed by user selection module 302, a pool of users can be selected from users involved in the user experience experiment. In accordance with one or more embodiments, the pool of users can comprise the set of users used in the user experience experiment, or a subset of the users. The pool of users can be selected by obtaining user response metric values from the user experience experiment for each user involved in the experiment.

By way of some non-limiting example, user response metrics with values that can be obtained can include days visited by the user, number of user sessions, number of clicks, number of classic page views, number of additive page views, number of articles read and the like. In discussing embodiments of the present disclosure, one or more of the metric values can be used to measure user response. By way of one non-limiting example, days visited can be one metric and corresponding value used to indicate user response. It should be apparent that any other metric and/or additional metrics can be used with embodiments of the present disclosure to measure user response. In accordance with one or more embodiments, a composite of multiple metrics can be used.

By way of a non-limiting example, to avoid any seasonality, a week of data can be obtained from the user experience experiment in connection with each of the users involved in the experiment, and the users in the user pool can be selected such that each day of the week has associated users who are engaged in the experiment (e.g., have a value for the user response metric) that day.

At step 406, which can be performed by data generation module 304, metric value data indicating user response data (e.g., days visited metric value) can be obtained for each user in the user pool over a second period (e.g., two weeks) during the user experience experiment. The metric value data obtained for a user at step 406 is a measurement of the user's response to one of the variants in the user experience experiment—the variant corresponding to the user group to which the user was assigned in the user experience experiment. A user response to a respective variant can be obtained for each user in the pool of users.

Additionally, at step 406 (which can be performed by module 304), user data (e.g., a set of features) can be determined for each user in the user pool. As discussed, each user in the user pool is assigned to one variant in the user experience experiment, and each user has user response data (e.g., a user response metric value) indicating the user's response to the variant to which the user is assigned. In accordance with at least one embodiment, the user group to which the user is assigned in the user experience experiment can be included in the user data.

The user data can include user attributes data. Some non-limiting examples of types of attribute data include user demographic data, user device data, user behavior data and the like. Some non-limiting examples of user demographic feature data include age, gender, user registration date, languages, designated market area (DMA), and geographic location information such as country, state, county, zip, and the like. Some non-limiting examples of user device feature data include user device type, browser name, browser version, operating system name and version, and the like. Some non-limiting examples of user behavior feature data include number of days visited by the user for a period (e.g., 28 day period) prior to the A/B test, user engagement in website properties (or services), usage in connection website properties (or services), and intent segments.

User engagement feature data can include an indicator of the property (e.g., Mail, News, Search, Finance, Sports, etc.) and a level of user engagement (e.g., Fanatic, Loyalist, Active, Occasional, Tourist). For example, the user feature data can include an indicator of "Sports Fanatic" indicating a user's level of engagement in connection with a "Sports" property as "Fanatic." Usage feature data can include information indicating a user's specific actions in connection with a given property for a period of time (e.g., 28 days prior to the A/B test). For example, "video stream: occasional" indicates that the user occasionally views streams video, and "Page View Finance Quotes: Loyalist" indicates the user is a regularly view financial quotes in the Finance property. User intent feature data can indicate a user's intent in connection with a given property. For example, "Mail Focus, Under-engaged" indicates that the user is not that engaged in the "Mail" property.

In accordance with one or more embodiments, the pool of users can be split into at least two user groups—a training user group, testing user group, evaluation user group and the like. Each user can be assigned to one of the user groups. By way of one non-limiting example, in the case of two groups, the split might be an 80-20 split, with 80% of the users in the pool being assigned to a training user group and 20% to evaluation user group. In accordance with one or more embodiments, with respect to each user group in the user experience experiment, 80% of the users assigned to each of the user groups used in the experiment can be assigned to a training user group and 20% of the users assigned to each user group used in the experiment can be assigned to the evaluation user group. By way of a further non-limiting example, the pool of users can be split into three groups—a training user group (e.g., 80% of the user pool), test user group (e.g., 10% of the user pool) and an evaluation user (e.g., 10% of the user pool).

At step 408, which can be performed by model generation module 306, the user data associated with users in the training user group can be used to determine training data to train a statistical model to make user response predictions. The user data associated with users in the evaluation user group can be used in evaluating the effectiveness of the experience research approach relative to the personalized user experience approach.

For each user in the training user group, the training data can comprise the user's determined set of features (e.g., assigned group in the user experience experiment and the user's demographic, device, behavioral, etc. features). The user response (e.g., days visited metric value) determined for the user from the experiment can be used as a label for supervised model training. For each user in the evaluation user group, as is discussed in more detail below, in a testing phase, the trained model can be used to generate a predicted user response to the variant corresponding to the user group to which the user is assigned in the user experience experiment. The predicted user response can be compared with the actual metric value determined for the user from the experiment to determine the trained model's level of accuracy.

In accordance with one or more embodiments, the training data determined (at step 406) for the users assigned to the training user group can be used to train the model, at step 408. In accordance with one or more embodiments, the model can be a regression model trained using a machine learning algorithm.

At step 410, model testing can be used to determine the accuracy of the trained model. The user data determined for the evaluation user group (or another group such as a testing user group) can be used to test the accuracy of the model trained at step 408. For purposes of testing the model, a given user's model testing data can comprise a designation indicating the user experience variant to which the user is assigned in the user experience experiment as well as user attribute data. The trained model receives a user's model testing data as input and uses it to generate a predicted user response (e.g., a predicted metric value, such as and without limitation a predicted number of days visited) to the variant for which the user has an actual user response by virtue of being assigned to the variant in the user experience experiment. The predicted user response can be compared with the actual user response to determine any difference. A user response prediction and any difference between that and the user's actual user response can be determined for each user in the testing user group. Thus, for each user in the testing user group, the user response prediction can be compared to the actual user response to determine any difference.

In accordance with one or more embodiments, an aggregate error (e.g., Mean Squared Error, Mean Absolute Error) can be determined using any differences determined for each of the users in the testing user group. The aggregate error can be used to determine whether or not the level of accuracy of the model is acceptable. If the level of accuracy of the model is unacceptable, the model can be retrained.

At step 412, which can be performed by simulation and evaluation module 308, the trained model can be used in a number of simulations to evaluate the effectiveness of the experience research (or global-best variant) approach designed to use a global-best user experience variant relative to a personalized user experience approach that uses the trained model to provide personalized user experience based on data about a user. That is, assuming an acceptable level of accuracy of the trained model during model testing (e.g., at step 410), an evaluation can be performed using the trained model to determine whether or not a personalized user experience approach that uses the trained model to provide personalized user experience based on data about a user can provide an improved user response over the experience research (or global-best variant) approach. As discussed herein, the outcome of the experience research conducted using a user experience experiment is the identification of a variant (the global-best user experience variant) to adopt across users. In contrast, personalized user experience approach that uses the trained model to provide personalized user experience based on data about a user described herein in connection with one or more embodiments uses the trained model to identify which variant a specific user (or user segment) is likely to prefer given an associated set of user data.

As discussed herein and in connection with step 414 of FIG. 4, the experience research (or global-best variant) approach and the personalized user experience approach can be evaluated relative to each other to determine which approach is more effective at optimizing (or maximizing) user response. In accordance with one or more embodiments, an evaluation can be performed to determine whether to use the outcome of the user experience experiment (e.g., the variant identified in the user experience experiment as the global-best variant) or to use the user personalization approach discussed herein.

Figure 5:
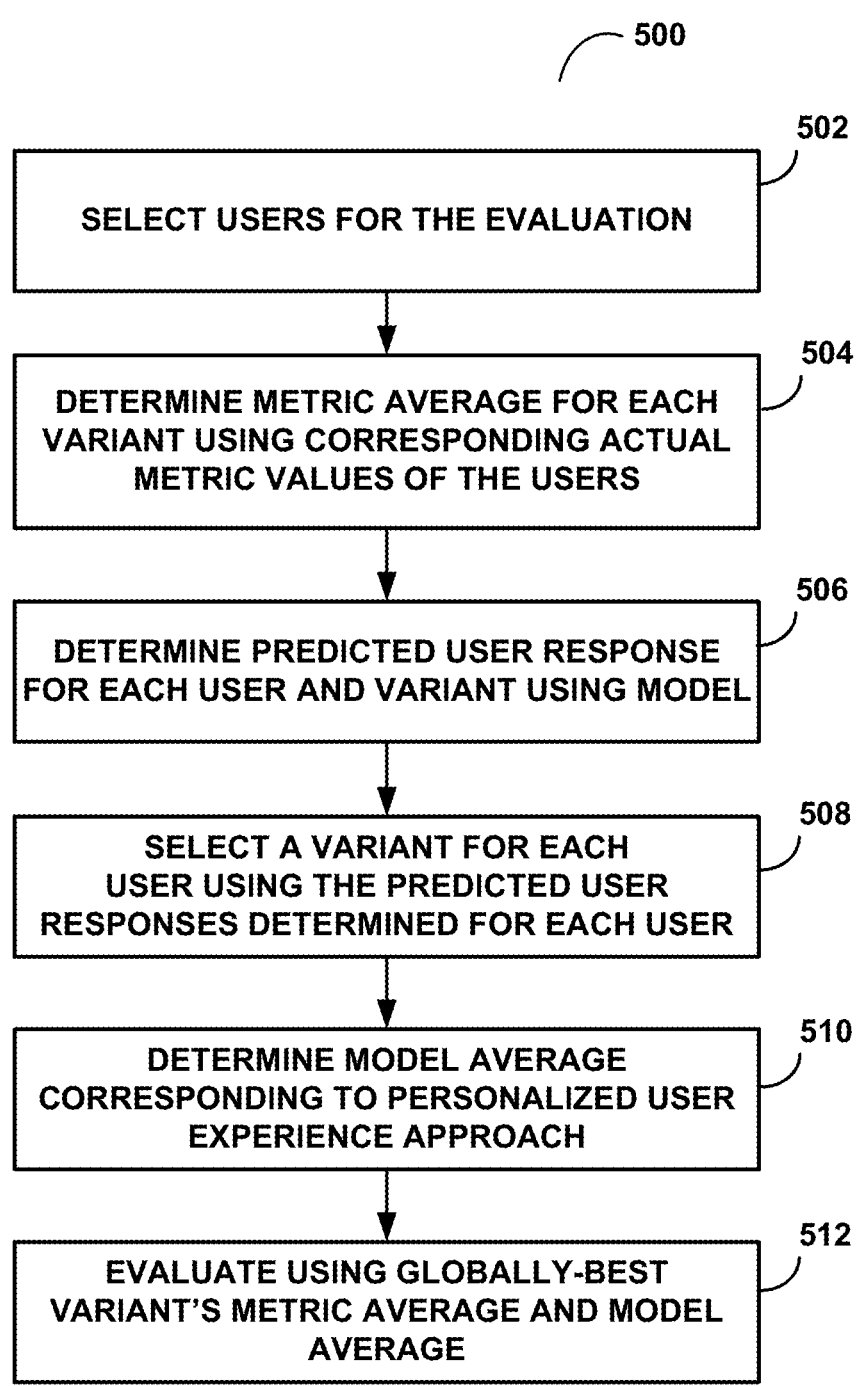
FIG. 5 is a flowchart illustrating steps performed in accordance with some embodiments of the present disclosure.

FIG. 5 provides a flowchart illustrating steps performed in such a simulation and evaluation in accordance with one or more embodiments. In accordance with one or more embodiments, the evaluation involves a simulation in which user response predictions generated by the trained model are compared with actual user responses obtained from the experiment, e.g., an A/B experiment.

Figure 6:
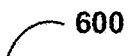

FIGS. 6-8 provide illustrative examples for use in illustrating a simulation used for evaluation. In the example, an experiment E has three variants A, B, and C which can be referred to collectively as variants, V In experiment E, the users in the user pool are equally distributed among three user groups, each user group corresponding to one of the variants V, and each user having two attributes X and Y.

In accordance with one or more embodiments, the evaluation involves a number of articles read metric as a user response measurement. An aggregate user response (e.g., an aggregated articles read value) can be determined for a global-best variant, and an aggregate user response prediction (an aggregate predicted articles read value) can be determined for the personalized user experience approach. These two aggregated user response values can be compared to determine which approach is more effective at optimizing user response as a measure of user engagement. In accordance with one or more embodiments, the global-best variant's aggregate user response can be a metric average and the aggregate user response prediction can be a model average, or prediction average, as is discussed in more detail below.

As discussed herein in connection with one or more embodiments, while a single metric can be used for the evaluation, it is also possible to use more than one metric. By way of a non-limiting example, a composite metric which is some combination of multiple metrics can be used for the evaluation.

Referring again to FIG. 5, at step 502, a number of users can be selected for the evaluation. As discussed above, the selected users are users involved in the experiment. By way of a non-limiting examples, the selected users can be the users selected for inclusion in the evaluation user group. By way of another non-limiting example, the selected users can be part of an evaluation user group separate the training user group and test user group.

At step 504, an average metric value can be determined for each user experience variant using corresponding actual metric values of the users in the evaluation user group. By way of a non-limiting example, user experience experiment E can be run for a time interval T Each user can have corresponding data comprising a value for each of the two attributes X and Y, a designation of the variant (e.g., variant A, B or C) corresponding to the user group to which the user is assigned in the user experience experiment, and a value for the metric M representing the user's response over the time interval T.

FIG. 6 provides table 600 comprising exemplary values for users involved in experiment E. Each row of table 600 corresponds to a user, and each row includes variant, attribute and metric columns. The variant column includes a designation indicating the variant (and user group) to which the user is assigned in experiment E The attribute columns indicate the value of each of the user attributes X and Y, and the metric column indicates the value of the metric. In the example discussed in connection with FIGS. 6-8, attribute X indicates the make of the user's car, attribute Y indicates whether or not the user own's a home, and the value of metric M (the user response measurement) is the number of articles read by the user.

Table 620 of FIG. 6 shows an average associated with each user experience variant. As shown in the example, a variant's average can be determined by summing the actual metric values corresponding to the variant and dividing the sum by the number of actual metric values corresponding to the variant. In the example, variant A has the highest (or best) metric average. Also, in the example, the metric average associated with variant Bis rounded down from 8.33 (the actual metric average) to 8 (as shown in row 622 of table 620) for ease in discussing the example.

Referring again to FIG. 5, at step 506, the trained model can be used to determine, for each user in the evaluation user group, a predicted user response (a predicted value of metric M) for each variant. As discussed herein in connection with one or more embodiments, a percent of the users in the user pool can be selected for the training user group so that each variant is represented by an equal number of users in the training user group. Additionally, a percent of the users in the user pool can be selected for the evaluation user group so that each variant is represented by an equal number of users in the evaluation user group. With reference to table 600 of FIG. 6, the first two users for each variant can be selected for inclusion in the training user group and each third user (corresponding to rows 602, 604 and 606 in table 600) for each variant can be selected for inclusion in the evaluation user group.

By way of a non-limiting example, training data generated for user100 comprises Tesla, Y and A with the metric value of 18 being used as the label for user100's training data. Training data can be similarly determined for the remaining users included in the training group. The labeled training data associated with the users in the training group (e.g., user100, user101, user200, user201, user300 and user301) can be input to a machine learning algorithm to train a model (e.g., a regression model) to predict metric M.

By way of a further non-limiting example, evaluation (or test) data generated for user102 comprises Kia, N and A. Since the model is used to generate a predicted metric value, the actual value of the metric is not used as a label for users in the evaluation (or testing) user group.

The trained model can then be used to predict the value of metric M for a user and variant using the user's attributes X and Y and a designation of the variant (e.g., one of variant A, B or C) for which a user response prediction is being sought from the trained model. That is, for a given user, the input to the trained model can comprise the values of attributes X and Y corresponding to the user and an indicator of the variant (e.g., variant A, B, or C) for which a predicted value of metric M is to be returned by the trained model. To obtain a predicted value of metric M for each variant, the user's attributes values can be separately input to the model along with a designation of one of the variants. In so doing, the trained model can provide predicted metric values $M_A$, $M_B$ and $M_C$ corresponding (respectively) to variants A, B and C, for each user in the evaluation user group. As is discussed in more detail below, table 800 includes prediction examples indicating a predicted number of articles read for each user (in the evaluation user group) and variant combination.

Table 700 of FIG. 7 illustrates exemplary user data for the users in the evaluation user group. Each row of table 700 corresponds to a user in the evaluation user group, and each row includes variant, attribute and metric columns. The variant column indicates the variant corresponding to the variant (or user group) to which the user is assigned in experiment E Each of the attribute columns corresponds to one of the user attributes and indicates the user attribute value for one of the user attributes X and Y.

The metric type column indicates whether the value in the metric column is an actual value or an estimate (e.g., an average) of the metric value. Since each user is assigned to one variant and one user group in experiment E, each user has an actual value for one of the variants—the variant to which the user is assigned in experiment E In such a case, the metric type is given as Actual. For each of the remaining variants for which there is no actual value for the user, the true value of metric M can be estimated. For example, with reference to table 700, user102 has an actual value for variant A, and user102's metric value for variants B and C are each an estimated metric value (e.g., a metric average).

In accordance with one or more embodiments, the estimated metric value for a variant can be an average of the actual metric values for the users assigned to the variant in experiment E Reference is made to table 620, which illustrates the average metric for each variant A, B and C By way of a non-limiting example, with reference to table 600, the metric average for variant A is the actual metric values for user100, user101 and user 02 (all of whom are assigned to variant A in experiment h) divided by the number of actual metric values. A metric average can be determined for each of the other variants in a similar manner.

By way of further illustration, since user102 is assigned to variant A in experiment E, user102 has an actual metric value for variant A and an estimate of the true metric value (e.g., a metric average indicated in table 620) for variants B and C. This is reflected in table 700, wherein user102 has an actual value for variant A of 5, and user102's metric value for variants B and C are 8 and 10 (respectively)—the average actual metric value determined for variants B and C, as shown in Table 620.

Referring again to FIG. 5, for each user in the evaluation user group, one of the variants Vis selected, at step 508, using the metric prediction provided by the trained model. In accordance with one or more embodiments, the user response can be optimized by selecting the variant with the highest metric prediction. In accordance with one or more embodiments, a goal of the evaluation can be to maximize the average of the metric M across all users by choosing, for a given user, the variant predicted by the trained model to have the highest user response (e.g., highest predicted metric value) and then using either the actual metric value or the metric average associated indicated for the user and chosen variant combination.

Table 800 provides some exemplary metric predictions (predicted number of articles read) which can be determined using the trained model. As discussed in connection with one or more embodiments, each metric prediction can be determined using the trained model and input comprising a user's attribute values and a variant designation designating the variant for which a predicted user response (or predicted metric) is sought from the trained model. Table 800 includes, for each user in the evaluation user group, a metric prediction for each variant in experiment E.

Table 800 further includes a column labeled "Chosen" indicating a variant selected for each user. As discussed above, for each user, the actual/average metric value corresponding to the highest metric prediction can be selected. In the example, variant Cis selected for user102, variant Bis selected for user202 and variant A is selected of user302. Table 800 also includes a metric value (either an actual value or a metric average) for each variant and user combination. As can be seen, a metric average is associated with variant C chosen for user102. Table 800 also shows the variants chosen for user202 and user302 and the corresponding actual metric or metric average.

At step 510, a model average (representing an aggregate user response prediction) corresponding to the personalized user experience approach can be determined. In accordance with one or more embodiments, the model average can be determined using the actual metric/metric average value associated with each of the variants selected at step 508. With reference to tables 800 and 810 of FIG. 8, each of the metric values from column 808 in rows 802, 804 and 806 of table 800 are used to determine a model average equal to 12, as shown in row 812 of table 810.

By way of further illustration, with reference to table 810, a model average can be determined for the personalized user experience approach using the actual metric/average metric values associated with the estimated metric values selected for user102, user202 and user302. For example, and from tables 800 and 810, actual/average metric values 10, 15 and 11 associated with the estimated metric values chosen (respectively) for user102, user202 and user302 can be summed and then divided by the number of metric values chosen, which results in an average of 12 (as shown in row 812 of table 810).

At step 512 (of FIG. 5), the globally-best variant's metric average (representing an aggregate user response for the global-best variant approach) and the model average (representing an aggregate user response prediction) determined for the personalized user experience approach can be used to evaluate the experience research (or global-best variant) approach relative to the personalized user experience approach. In accordance with one or more embodiments, the globally-best variant's metric average and the model average can be compared to determine which average is best (e.g., higher) at optimizing user response (and user engagement).

With reference to table 620 of FIG. 6, the globally-best variant is variant A, since it has the best metric average relative to the metric averages associated with variants B and C However, with reference to table 810, the model average is better than variant A's metric average.

In accordance with one or more embodiments, if the trained model is able to achieve a model average higher than the metric average of any of the variants, it can be considered to outperform each of the variants, including the global-best variant. As can be seen from table 810, the model outperformed each of the individual variant's metric averages.

Thus, the evaluation can be used to determine that the personalized user experience approach is better at optimizing user response than the experience research (or global-best variant) approach. In accordance with one or more embodiments, the personalized user experience approach can be recommended for user rather than the experience research (or global-best variant) approach. In accordance with one or more embodiments, the personalized user experience approach might be further tested in a production setting with the user population to determine whether the results of the evaluation can be replicated with the user population.

Additionally, the evaluation can be used to determine that the experience research (or global-best variant) approach is better at optimizing user response than the personalized user experience approach. In accordance with one or more embodiments, the experience research (or global-best variant) approach can be recommended for user rather than the personalized user experience approach. In accordance with one or more embodiments, the experience research (or global-best variant) approach might be further tested in a production setting with the user population to determine whether the results of the evaluation can be replicated with the user population.

In accordance with one or more embodiments, the evaluation process described herein in connection with one or more embodiments can be used to identify which of the two approaches is better at optimizing user response (or user engagement). The result of the evaluation can be used to identify which approach to adopt.

Figure 9:
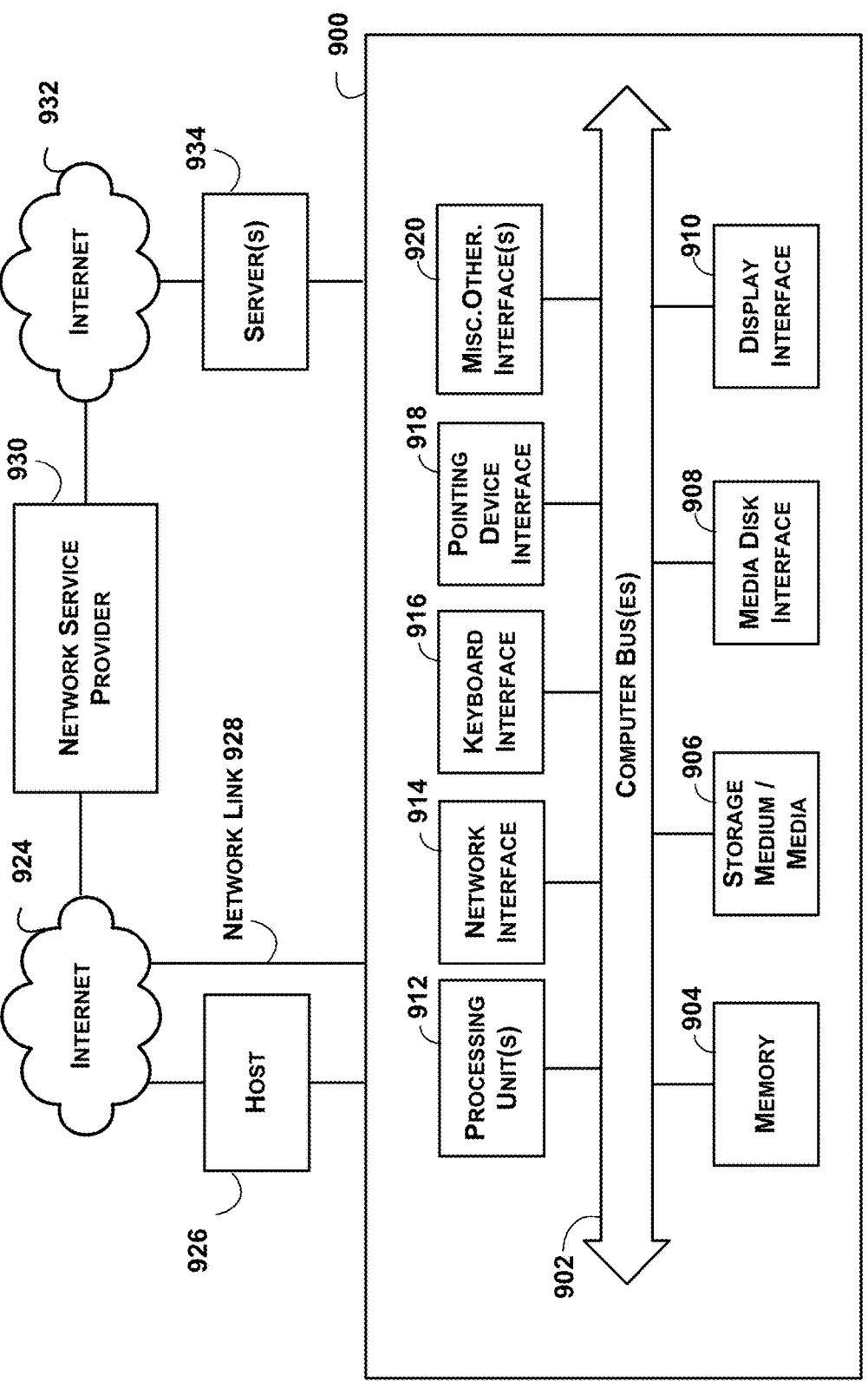
FIG. 9 is a block diagram illustrating the architecture of an exemplary hardware device in accordance with one or more embodiments of the present disclosure.

As shown in FIG. 9, internal architecture of a computing system 900 (e.g., computing device(s), computing platform, user devices, set-top box, smart TV and the like) includes one or more processing units, processors, or processing cores, (also referred to herein as CPUs) 912, which interface with at least one computer bus 902. Also interfacing with computer bus 902 are computer-readable medium, or media, 906, network interface 914, memory 904, e.g., random access memory (RAM), run-time transient memory, read only memory (ROM), media disk drive interface 908 as an interface for a drive that can read and/or write to media, display interface 910 as interface for a monitor or other display device, keyboard interface 916 as interface for a keyboard, pointing device interface 918 as an interface for a mouse or other pointing device, and miscellaneous other interfaces 920 not shown individually, such as parallel and serial port interfaces and a universal serial bus (USB) interface.

Memory 904 interfaces with computer bus 902 so as to provide information stored in memory 904 to CPU 912 during execution of software programs such as an operating system, application programs, device drivers, and software modules that comprise program code, and/or computer executable process steps, incorporating functionality described herein, e.g., one or more of process flows described herein. CPU 912 first loads computer executable process steps from storage, e.g., memory 904, computer readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 928 typically provides information communication using transmission media through one or more networks to other devices that use or process the information. For example, network link 928 may provide a connection through local network 924 to a host computer 926 or to equipment operated by a Network or Internet Service Provider (ISP) 930. ISP equipment in turn provides data communication services through the public, worldwide packet-switching communication network of networks now commonly referred to as the Internet 932.

A computer called a server host 934 connected to the Internet 932 hosts a process that provides a service in response to information received over the Internet 932. For example, server host 934 hosts a process that provides information representing video data for presentation at a display coupled to display interface 910. It is contemplated that the components of system 900 can be deployed in various configurations within other computer systems, e.g., host and server.

At least some embodiments of the present disclosure are related to the use of computer system 900 for implementing some or all of the techniques described herein. According to one embodiment, those techniques are performed by computer system 900 in response to processing unit 912 executing one or more sequences of one or more processor instructions contained in memory 904. Such instructions, also called computer instructions, software and program code, may be read into memory 904 from another computer-readable medium 906 such as storage device or network link. Execution of the sequences of instructions contained in memory 904 causes processing unit 912 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 900. Computer system 900 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 912 as it is received, or may be stored in memory 904 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:

receiving, at a computing device, an evaluation request in connection with a user experience experiment designed to adopt a global-best user experience variant, from a number of user experience variants, of software application's user interface, the user experience experiment involving each of a number of user groups being presented with a corresponding experience variant of the software application's user interface;

forming, via the computing device, a training user group and an evaluation user group using a pool of users from the number of user groups;

obtaining, via the computing device and for each user in the user pool, user data comprising, for each user, an experience variant designation and a corresponding user response metric indicating the user's response, captured via the software application, to a respective user experience variant of the software application's user interface presented, by the software application, to the user, at a computing device of the user, during the user experience experiment, the user data further comprising a number of user attributes;

using, via the computing device, the experience variant designation and the corresponding user response metric obtained for each user in the evaluation user group to determine a number of aggregate user responses corresponding to the number of user experience variants;

using, via the computing device, the number of aggregate user responses to identify one of the number of user experience variants with a corresponding aggregate user response greater than each other of the number of aggregate user response as the global-best user experience variant for evaluation;

generating, via the computing device, training data using the user data corresponding to each user assigned to the training user group;

training, via the computing device using a machine learning algorithm, a user response prediction model using the training data;

using, via the computing device, the trained user response prediction model to determine, for each user in the evaluation user group, a variant preference prediction identifying one of the number of user experience variants and a corresponding user response prediction;

determining, via the computing device, an aggregate user response prediction using the user response prediction determined for each user in the evaluation user group;

automatically evaluating, via the computing device, an ability of the global-best user experience variant at optimizing user response relative to the trained user response prediction model's ability using the global-best user experience variant's corresponding aggregate user response and the aggregate user response prediction;

identifying, via the computing device, from the number of user experience variants, a user experience variant that, based on the evaluation, optimizes the software application's user response; and presenting, by the software application, the identified user experience variant as its user interface at a number of user computing devices.

2. The method of claim 1, identifying a user experience variant further comprising:

using, via the computing device, the trained user response prediction model and a given user's data to identify a specific user experience variant that is used by the software application as its user interface to personalize the software application's user interface for the given user rather than the software application using the global-best user experience variant as its user interface across users if the aggregate user response prediction is greater than the aggregate user response corresponding to the global-best user experience variant of the software application's user interface.

3. The method of claim 1, identifying a user experience variant further comprising:

identifying, via the computing device, the global-best user experience variant as the user experience variant that is used by the software application as the user experience variant that is used by the software application as its user interface if the aggregate user response corresponding to the global-best user experience variant of the software application's user interface is greater than the aggregate user response prediction.

4. The method of claim 1, further comprising:

selecting, via the computing device, an equal number of users from each user group to form the user pool.

5. The method of claim 1, the training data generated for a user assigned to the training user group comprising the number of user attributes and the user's experience variant designation from the user's data, the corresponding experience metric being used as a label for the training data generated for the user.

6. The method of claim 1, each aggregate user response, from the number of aggregate user responses, is a metric average corresponding to one of the number of user experience variants, a user experience variant's metric average being determined using each experience metric, from the user data obtained for the evaluation user group, determined to correspond to the user experience variant using the corresponding experience variant designation.

7. The method of claim 6, the one of the number of user experience variants identified as the global-best user experience variant for evaluation having a higher metric average than relative to the metric average determined for each other user experience variant.

8. The method of claim 1, determining a user response prediction further comprising:

determining a predicted-best user experience variant for each user in the evaluation user group using the trained user response prediction model;

determining a user response metric for the predicted-best user experience variant determined for each user.

9. The method of claim 8, determining an aggregate user response prediction further comprising:

determining a model average using the user response metric determined for each predicted-best user experience variant.

10. The method of claim 8, determining a predicted-best user experience variant for each user in the evaluation user group using the trained user response prediction model further comprising:

determining, for a user in the evaluation user group, a user response prediction for each user experience variant, the determining comprising, for a user experience variant of the number of user experience variants, using the user's attributes and the user experience variant's designation as input to the trained user response prediction model; and selecting, for the user in the evaluation user group, one of the number of user experience variants with a higher user response prediction relative to the user response prediction corresponding to each other user experience variant to be the predicted-best user experience variant.

11. The method of claim 8, determining a user response metric for each user's predicted-best user experience, further comprising:

for a user in the evaluation user group, using the corresponding metric from the user's user data as the user's user response metric if the user's experience variant designation from the user's user data designates the predicted-best user experience variant or otherwise using the aggregate user response, from the number of aggregate user responses, corresponding to the user's experience variant determined to be the user's predicted-best user experience variant.

12. A non-transitory computer-readable storage medium tangibly encoded with computer-executable instructions that when executed by a processor associated with a computing device perform a method comprising:

receiving an evaluation request in connection with a user experience experiment designed to adopt a global-best user experience variant, from a number of user experience variants, of a software application's user interface, the user experience experiment involving each of a number of user groups being presented with a corresponding experience variant of the software application's user interface;

forming a training user group and an evaluation user group using a pool of users from the number of user groups;

obtaining, for each user in the user pool, user data comprising, for each user, an experience variant designation and a corresponding user response metric indicating the user's response, capturing via the software application, to a respective user experience variant of the software application's user interface presented, by the software application, to the user, at a computing device of the user, during the user experience experiment, the user data further comprising a number of user attributes;

using the experience variant designation and the corresponding user response metric obtained for each user in the evaluation user group to determine a number of aggregate user responses corresponding to the number of user experience variants;

using the number of aggregate user responses to identify one of the number of user experience variants with a corresponding aggregate user response greater than each other of the number of aggregate user response as the global-best user experience variant for evaluation;

generating training data using the user data corresponding to each user assigned to the training user group;

training a user response prediction model using a machine learning algorithm and the training data;

using the trained user response prediction model to determine, for each user in the evaluation user group, a variant preference prediction identifying one of the number of user experience variants and a corresponding user response prediction;

determining an aggregate user response prediction using the user response prediction determined for each user in the evaluation user group;

automatically evaluating an ability of the global-best user experience variant at optimizing user response relative to the trained user response prediction model's ability using the global-best user experience variant's corresponding aggregate user response and the aggregate user response prediction;

identifying, from the number of user experience variants, a user experience variant that, based on the evaluation, optimizes the software application's user response; and presenting, by the software application, the identified user experience variant is used by the software application as its user interface at a number of user computing devices.

13. The non-transitory computer-readable storage medium of claim 12, identifying a user experience variant further comprising:

using the trained user response prediction model and a given user's data to identify a specific user experience variant that is used by the software application as its user interface to personalize the software application's user interface for the given user rather than the software application using the global-best user experience variant as the software application's user interface across users if the aggregate user response prediction is greater than the aggregate user response corresponding to the global-best user experience variant of the software application's user interface.

14. The non-transitory computer-readable storage medium of claim 12, identifying a user experience variant further comprising:

identifying the global-best user experience variant as the user experience variant that is used by the software application as its user interface if the aggregate user response corresponding to the global-best user experience variant of the software application's user interface is greater than the aggregate user response prediction.

15. The non-transitory computer-readable storage medium of claim 12, each aggregate user response, from the number of aggregate user responses, is a metric average corresponding to one of the number of user experience variants, a user experience variant's metric average being determined using each experience metric, from the user data obtained for the evaluation user group, determined to correspond to the user experience variant using the corresponding experience variant designation.

16. The non-transitory computer-readable storage medium of claim 15, the one of the number of user experience variants identified as the global-best user experience variant for evaluation having a higher metric average than relative to the metric average determined for each other user experience variant.

17. The non-transitory computer-readable storage medium of claim 12, determining a user response prediction further comprising:

determining a predicted-best user experience variant for each user in the evaluation user group using the trained user response prediction model;

determining a user response metric for the predicted-best user experience variant determined for each user.

18. The non-transitory computer-readable storage medium of claim 17, determining a predicted-best user experience variant for each user in the evaluation user group using the trained user response prediction model further comprising:

determining, for a user in the evaluation user group, a user response prediction for each user experience variant, the determining comprising, for a user experience variant of the number of user experience variants, using the user's attributes and the user experience variant's designation as input to the trained user response prediction model; and selecting, for the user in the evaluation user group, one of the number of user experience variants with a higher user response prediction relative to the user response prediction corresponding to each other user experience variant to be the predicted-best user experience variant.

19. The non-transitory computer-readable storage medium of claim 17, determining a user response metric for each user's predicted-best user experience, further comprising:

for a user in the evaluation user group, using the corresponding metric from the user's user data as the user's user response metric if the user's experience variant designation from the user's user data designates the predicted-best user experience variant or otherwise using the aggregate user response, from the number of aggregate user responses, corresponding to the user's experience variant determined to be the user's predicted-best user experience variant.

20. A computing device comprising:

a processor;

a non-transitory storage medium for tangibly storing thereon program logic for execution by the processor, the program logic comprising:

receiving logic executed by the processor for receiving an evaluation request in connection with a user experience experiment designed to adopt a global-best user experience variant, from a number of user experience variants, of a software application's user interface, the user experience experiment involving each of a number of user groups being presented with a corresponding user experience variant of the software application's user interface;

forming logic executed by the processor for forming a training user group and an evaluation user group using a pool of users from the number of user groups;

obtaining logic executed by the processor for obtaining, for each user in the user pool, user data comprising, for each user, an experience variant designation and a corresponding user response metric indicating the user's response, captured via the software application, to a respective user experience variant of the software application's user interface presented, by the software application, to the user, at a computing device of the user, during the user experience experiment, the user data further comprising a number of user attributes;

using logic executed by the processor for using the experience variant designation and the corresponding user response metric obtained for each user in the evaluation user group to determine a number of aggregate user responses corresponding to the number of user experience variants;

using logic executed by the processor for using the number of aggregate user responses to identify one of the number of user experience variants with a corresponding aggregate user response greater than each other of the number of aggregate user response as the global-best user experience variant for evaluation;

generating logic executed by the processor for generating training data using the user data corresponding to each user assigned to the training user group;

training logic executed by the processor for training a user response prediction model using a machine learning algorithm and the training data;

using logic executed by the processor for using the trained user response prediction model to determine, for each user in the evaluation user group, a variant preference prediction identifying one of the number of user experience variants and a corresponding user response prediction;

determining logic executed by the processor for determining an aggregate user response prediction using the user response prediction determined for each user in the evaluation user group;

evaluating logic executed by the processor for automatically evaluating an ability of the global-best user experience variant at optimizing user response relative to the trained user response prediction model's ability using the global-best user experience variant's corresponding aggregate user response and the aggregate user response prediction;

identifying logic executed by the processor for identifying, from the number of user experience variants, a user experience variant that, based on the evaluation, optimized the software application's user response, the identified user experience variant being presented, by the software application, as its user interface at a number of user computing devices.

* * * * *